United States Patent
Manula et al.

(10) Patent No.: US 9,336,158 B2
(45) Date of Patent: May 10, 2016

(54) METHOD AND SYSTEM FOR SIMPLIFIED ADDRESS TRANSLATION SUPPORT FOR STATIC INFINIBAND HOST CHANNEL ADAPTOR STRUCTURES

(71) Applicant: Oracle International Corporation, Redwood City, CA (US)

(72) Inventors: Brian Edward Manula, Oslo (NO); Haakon Ording Bugge, Oslo (NO)

(73) Assignee: Oracle International Corporation, Redwood Shores, CA (US)

( * ) Notice: Subject to any disclaimer, the term of this patent is extended or adjusted under 35 U.S.C. 154(b) by 265 days.

(21) Appl. No.: 13/777,560

(22) Filed: Feb. 26, 2013

(65) Prior Publication Data
US 2014/0244965 A1  Aug. 28, 2014

(51) Int. Cl.
*G06F 12/00* (2006.01)
*G06F 12/10* (2016.01)
*G06F 12/02* (2006.01)
*G06F 13/16* (2006.01)
*G06F 13/12* (2006.01)

(52) U.S. Cl.
CPC ........ *G06F 12/1081* (2013.01); *G06F 12/0223* (2013.01); *G06F 12/0292* (2013.01); *G06F 12/1009* (2013.01); *G06F 13/12* (2013.01); *G06F 13/1642* (2013.01); *G06F 13/1673* (2013.01); *G06F 2212/151* (2013.01)

(58) Field of Classification Search
CPC ............. G06F 12/223; G06F 12/0292; G06F 12/1009; G06F 13/12; G06F 13/1642; G06F 13/1673
USPC ............. 711/154, 206; 710/52, 310; 712/225, 712/218
See application file for complete search history.

(56) References Cited

U.S. PATENT DOCUMENTS

| | | |
|---|---|---|
| 6,459,698 B1 | 10/2002 | Acharya |
| 6,563,790 B1 | 5/2003 | Yu et al. |
| 6,741,559 B1 | 5/2004 | Smeulders et al. |
| 6,785,760 B2 * | 8/2004 | Asselin .................. 710/315 |
| 6,789,143 B2 | 9/2004 | Craddock et al. |
| 6,917,987 B2 | 7/2005 | Parthasarathy et al. |
| 7,136,353 B2 | 11/2006 | Ha et al. |
| 7,330,918 B2 | 2/2008 | Yamamoto et al. |
| 7,496,698 B2 | 2/2009 | Biran et al. |
| 7,609,636 B1 | 10/2009 | Mott |

(Continued)

OTHER PUBLICATIONS

Singh et al., "Extending Work Queue of HCA Endpoint using Software Work Queue approach: Experimental Evaluation with uDAPL", 2011, IEEE, pp. 376-379.*

*Primary Examiner* — Reba I Elmore
(74) *Attorney, Agent, or Firm* — Osha • Liang LLP

(57) ABSTRACT

A method for optimized address pre-translation for a host channel adapter (HCA) static memory structure is disclosed. The method involves determining whether the HCA static memory structure spans a contiguous block of physical address space, when the HCA static memory structure spans the contiguous block of physical address space, requesting a translation from a guest physical address (GPA) to a machine physical address (MPA) of the HCA static memory structure, storing a received MPA corresponding to the HCA static memory structure in an address control and status register (CSR) associated with the HCA static memory structure, marking the received MPA stored in the address CSR as a pre-translated address, and using the pre-translated MPA stored in the address CSR when a request to access the static memory structure is received.

18 Claims, 5 Drawing Sheets

(56) References Cited

U.S. PATENT DOCUMENTS

| | | |
|---|---|---|
| 7,742,497 B2 | 6/2010 | Ganti et al. |
| 7,769,015 B2 | 8/2010 | Huang et al. |
| 7,782,805 B1 | 8/2010 | Belhadj et al. |
| 7,817,634 B2 | 10/2010 | Coffman et al. |
| 7,830,919 B1 | 11/2010 | Thompson |
| 7,899,050 B2 | 3/2011 | Craddock et al. |
| 8,244,946 B2 | 8/2012 | Gupta et al. |
| 8,255,475 B2 | 8/2012 | Kagan et al. |
| 8,259,576 B2 | 9/2012 | Lee et al. |
| 8,259,746 B2 | 9/2012 | Lo et al. |
| 8,274,976 B2 | 9/2012 | Aloni et al. |
| 8,296,386 B1 | 10/2012 | Micalizzi, Jr. |
| 2001/0036185 A1 | 11/2001 | Dempo |
| 2003/0101158 A1 | 5/2003 | Pinto et al. |
| 2004/0193830 A1* | 9/2004 | Haren et al. .................. 711/202 |
| 2005/0018669 A1 | 1/2005 | Arndt et al. |
| 2005/0060443 A1 | 3/2005 | Rosner |
| 2005/0060445 A1* | 3/2005 | Beukema et al. ............... 710/52 |
| 2005/0135419 A1 | 6/2005 | Pullen et al. |
| 2005/0223118 A1 | 10/2005 | Tucker et al. |
| 2007/0008886 A1 | 1/2007 | Chen et al. |
| 2007/0019665 A1 | 1/2007 | Benveniste |
| 2007/0165672 A1 | 7/2007 | Keels et al. |
| 2007/0223472 A1 | 9/2007 | Tachibana et al. |
| 2007/0223483 A1 | 9/2007 | Huang et al. |
| 2007/0242686 A1 | 10/2007 | Zegers et al. |
| 2008/0028116 A1* | 1/2008 | Gregg et al. .................. 710/263 |
| 2008/0140984 A1 | 6/2008 | Shearer |
| 2008/0168194 A1 | 7/2008 | Gregg et al. |
| 2009/0125604 A1 | 5/2009 | Chang et al. |
| 2010/0281201 A1* | 11/2010 | O'Brien et al. ............... 710/308 |
| 2011/0216648 A1 | 9/2011 | Mehrotra et al. |
| 2012/0151116 A1* | 6/2012 | Tuch et al. ........................ 711/6 |
| 2012/0239832 A1 | 9/2012 | Subramanian et al. |

* cited by examiner

METHOD AND SYSTEM FOR SIMPLIFIED ADDRESS TRANSLATION SUPPORT FOR STATIC INFINIBAND HOST CHANNEL ADAPTOR STRUCTURES

BACKGROUND

The Infiniband® network includes nodes that communicate through a channel-based switched fabric. (Infiniband® is a registered trademark of Infiniband Trade Association, located in Beaverton, Oreg.). For example, the nodes may be a host, an input/output subsystem, or a router which connects to another network. The switched fabric is made of a collection of switches, routers, and/or links that connect a set of channel adapters. The channel adapters form an interface between the switched fabric and the nodes. The channel adapter of the host is referred to as a host channel adapter (HCA). The channel adapter of an input/output (I/O) subsystem is referred to as a target channel adapter.

In Infiniband®, two processes communicate using a queue pair. A queue pair (QP) includes a send queue and a receive queue. Specifically, in order for a process to send a message to another process, the process posts the message to the send queue. More specifically, per the Infiniband® protocol, each message transmitted/received has a corresponding send queue and a corresponding receive queue. An application uses the send queue to send messages and the receive queue to receive messages. The send queue and receive queue on the same host that is used by the application to communicate with another application form a QP. Each QP may have a corresponding QP with which to communicate. For example, consider the scenario where application M is communicating with application N. In such a scenario, application M may have QP M, with send queue M and receive queue M, and application N may have QP N, with send queue N and receive queue N. Messages from application M to application N are sent from send queue M to receive queue N. Messages from application N to application M are sent from send queue N to receive queue M. Logic and data structures used by the host system specify which QP on the recipient to use to send messages. Thus, by the requestor application specifying the QP, the requestor application is identifying the responder application to receive the message. Each packet that is sent may include a packet sequence number. Logic associated with the receive queue ensures that packets are processed in a particular order using the packet sequence number.

Infiniband® supports virtual-to-physical address translation services for translations associated with host memory accesses. When an I/O device, such as the HCA, requests to access host memory, the I/O device typically obtains a translation for one or more HCA structures (e.g., tables or other data structures to which the HCA may be writing or reading from) from hardware located in the host. The I/O device may store/cache the obtained translation in the I/O device itself for future use.

SUMMARY

In general, in one aspect, the invention relates to a method for optimized address pre-translation for a host channel adapter (HCA) static memory structure, comprising determining that the HCA static memory structure spans a contiguous block of physical address space, requesting, based on the HCA static memory structure spans the contiguous block of physical address space, a translation from a guest physical address (GPA) to a machine physical address (MPA) of the HCA static memory structure, storing a received MPA corresponding to the HCA static memory structure in an address control and status register (CSR) associated with the HCA static memory structure, marking the received MPA stored in the address CSR as a pre-translated address, and using the pre-translated address stored in the address CSR when a request to access the static memory structure is received.

In general, in one aspect, the invention relates to a host channel adapter (HCA) comprising an embedded processor subsystem (EPS) comprising an address translation interface (ATI), wherein the EPS is configured to issue a guest physical address (GPA) to machine physical address (MPA) request via the ATI, a PCIe core component configured to receive and respond to the GPA to MPA address translation request from the EPS, and an address control and status register (CSR) corresponding to an HCA static memory structure, wherein the EPS is further configured to determine whether the HCA static memory structure spans a contiguous block of physical address space, issue the GPA to MPA request of the HCA static memory structure, when the HCA static memory structure spans the contiguous block of physical address space to obtain a pre-translated address for the HCA static memory structure, store the pre-translated address corresponding to the HCA static memory structure in the address CSR corresponding to the HCA static memory structure, and mark the pre-translated address stored in the address CSR as pre-translated.

In general, in one aspect, the invention relates to a system comprising a host comprising a root complex configured to translate guest physical addresses (GPAs) to machine physical addresses (MPAs), and an HCA operatively connected to the host and comprising a plurality of address CSRs, each of which correspond to one of a plurality of HCA static memory structures, an EPS comprising an address translation interface (ATI), wherein the EPS is configured to issue a guest physical address (GPA) to machine physical address (MPA) request via the ATI, and a PCIe core configured to receive and respond to the GPA to MPA address translation request from the EPS, wherein the EPS is further configured to determine whether the HCA static memory structure spans a contiguous block of physical address space, issue the GPA to MPA request of the HCA static memory structure, when the HCA static memory structure spans the contiguous block of physical address space to obtain a pre-translated address for the HCA static memory structure, store the pre-translated address corresponding to the HCA static memory structure in the address CSR corresponding to the HCA static memory structure, and mark the pre-translated address stored in the address CSR as pre-translated.

Other aspects of the invention will be apparent from the following description and the appended claims.

DETAILED DESCRIPTION

Figure 1:
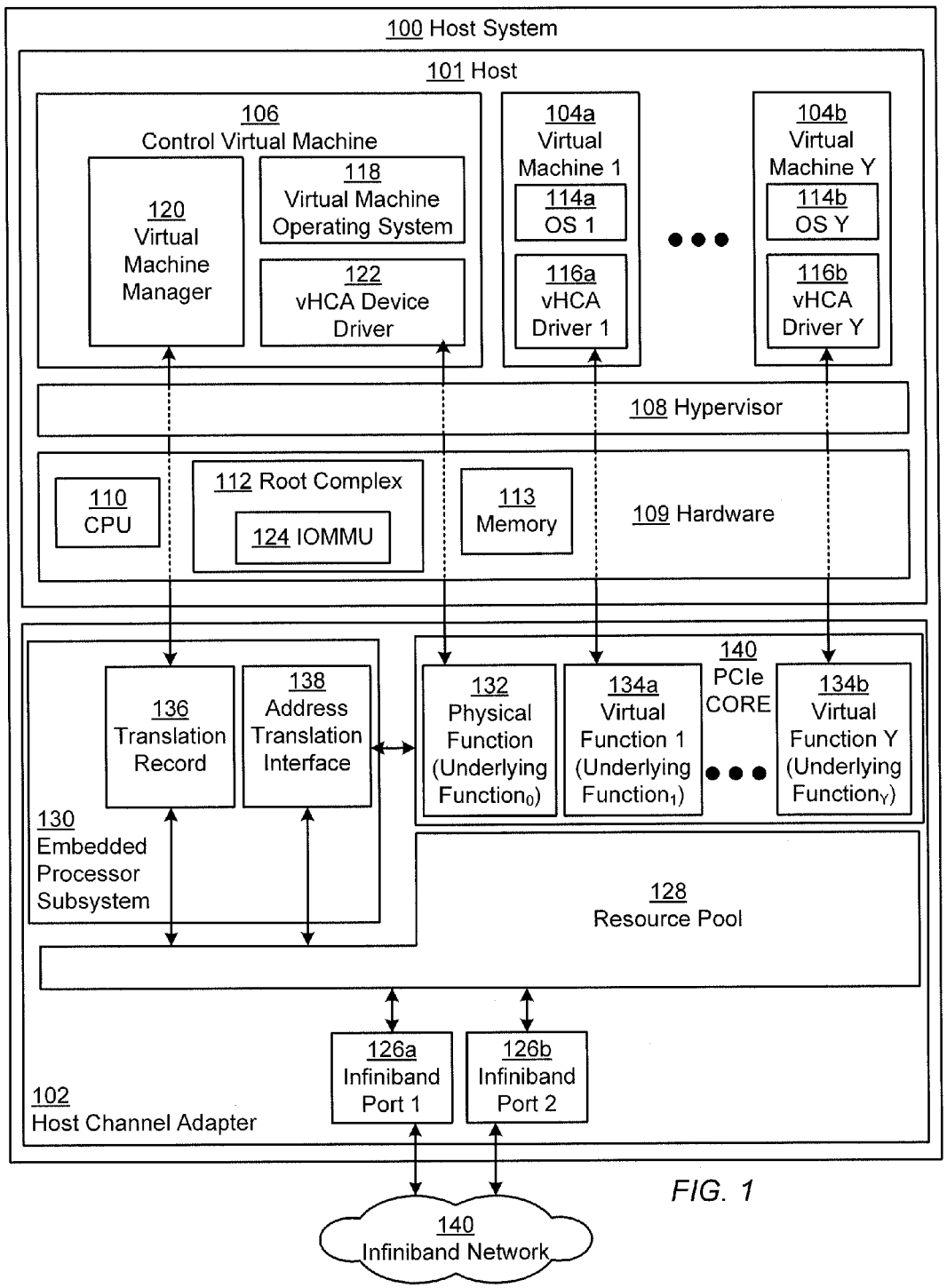
FIGS. 1-2 show schematic diagrams in one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide hardware facilities on a host channel adapter (HCA) for obtaining pre-translations of static memory structures of the HCA. In one or more embodiments of the invention, static memory structures are defined as persistent, control data structures that remain at the same guest physical address (GPA) (i.e., one of the layers of virtual addressing) and machine physical address (MPA) as long as the virtual HCA (vHCA) is executing. In other words, static memory structures do not change locations in memory and are addressed by the same GPA and MPA from the time the vHCA is started, and for as long as the vHCA is executing. In one or more embodiments, firmware within the HCA is provided with an interface for requesting and receiving address translations of static memory structures before such translations are requested/required by I/O devices. Hardware within the Infiniband® HCA stores the pre-translations of particular static memory structures and passes the pre-translation along on the PCIe bus when accessing host memory. In one or more embodiments of the invention, the I/O device requesting access to host memory is the HCA.

FIG. 1 shows a schematic diagram of a host system (100) in one or more embodiments of the invention. In one or more embodiments of the invention, the host system (100) is any physical computing device. Specifically, the host system (100) includes at least a minimum amount of hardware necessary to process instructions. As shown in FIG. 1, the host system (100) includes a host (101) and a host channel adapter (102) in one or more embodiments of the invention. These components are discussed below.

In one or more embodiments of the invention, the host (101) includes one or more guest virtual machines (e.g., virtual machine 1 (104a), virtual machine Y (104b)), a control virtual machine (106), a hypervisor (108), and a root complex (112). Each of these components is discussed below.

Broadly speaking, the virtual machines (e.g., virtual machine 1 (104a), virtual machine Y (104b), control virtual machine (106)) are distinct operating environments configured to inherit underlying functionality of the host operating system via an abstraction layer. In one or more embodiments of the invention, each virtual machine includes a separate instance of an operating system (e.g., OS 1 (114a), OS Y (114b)) (OS in FIG. 1). The separate instances of the operating system may be the same type of operating system or different types of operating systems.

Specifically, the guest virtual machine operating system (e.g., OS 1 (114a), OS Y (114b)) operates as if the guest virtual machine operating system is the only operating system on the host (101) and the resources (e.g., processor cycles, memory, resources of the host channel adapter) allocated to the guest virtual machine are the only resources available on the host (101). Thus, the guest virtual machine operating system (e.g., OS 1 (114a), OS Y (114b)) includes functionality to control the operating environment of applications executing in the guest virtual machine using resource allocated to the guest virtual machine. Each virtual machine may be allocated disjoint or non-overlapping physical memory (113).

Many different types of virtual machines exist. For example, the Xen® virtualization project allows for multiple guest operating systems executing in a host operating system. Xen® is a trademark overseen by the Xen Project Advisory Board. In one embodiment of the invention, the host operating system supports virtual execution environments (not shown). Another example is a Solaris™ Container. In such cases, the Solaris™ Container may execute in the host operating system, which may be a Solaris™ operating system. Solaris™ is a trademark of Oracle America, Inc. In one embodiment of the invention, the host operating system may include both virtual machines and virtual execution environments.

In one or more embodiments of the invention, the guest virtual machine includes a virtual host channel adapter device driver (e.g., vHCA driver 1 (116a), vHCA driver Y (116b)). The virtual host channel adapter device driver is software program that provides an interface to host channel adapter (102) for the guest virtual machine operating system. Specifically, when the guest virtual machine operating system wants to send commands to the host channel adapter (102), the virtual machine operating system invokes a routine in the virtual host channel adapter device driver (122). In response, the virtual host channel adapter device driver issues commands to a virtualized device controller (not shown) presented by the hypervisor (108) (discussed below). In turn, the hypervisor (108) includes functionality to transmit the message to the host channel adapter (102).

In addition to the guest virtual machine (e.g., virtual machine 1 (104a), virtual machine Y (104b)), the host (101) may also include a control virtual machine (106). In one or more embodiments of the invention, the control virtual machine (106) has a separate address space and operating system environment than the guest virtual machine (e.g., virtual machine 1 (104a), virtual machine Y (104b)). The control virtual machine (106) includes a control virtual machine operating system (118), a control virtual machine manager (120), and a virtual machine host channel adapter device driver (122). The virtual machine host channel adapter device driver (122) includes functionality similar to the guest virtual machine host channel adapter device drivers (e.g., vHCA driver 1 (116a), vHCA driver Y (116b)) discussed above. The host virtual machine operating system (118) includes functionality to provide an operating environment for software executing in the control virtual machine (106).

In one or more embodiments of the invention, the software executing in the control virtual machine (106) includes a virtual machine manager (120) (discussed below). In one or more embodiments of the invention, the virtual machine manager (120) includes functionality to configure the hypervisor (108), configure the host channel adapter (102), create, remove, and configure guest virtual machines, and perform the management of the host (101). With regards to configuring the host channel adapter, the virtual machine manager includes functionality to send commands to the host channel adapter to adjust the number of resources allocated to each virtual machine. To receive parameter values for performing the above management tasks, the virtual machine manager (120) may include a user interface and/or an application programming interface for communicating with a computer administrator or another program in one or more embodiments of the invention.

Continuing with FIG. 1, the hypervisor (108) includes functionality to control the sharing of hardware resources on the host (101). Specifically, the hypervisor (108) includes functionality to virtualize the physical devices of the host (101) so that more than one operating system may share the same physical device transparently in accordance with one or more embodiments of the invention. Further, the hypervisor (108) controls when the guest virtual machine (e.g., virtual machine 1 (104a), virtual machine Y (104b)) and the control virtual machine (106) are allowed to execute. For example, the hypervisor (108) may be a thin-privileged layer of software that only manages which guest virtual machine or the host virtual machine (106) is executing.

Continuing with the host, the host (101) includes hardware (109). The hardware (109) may include, for example, a central processing unit (CPU) (110), memory (113), and a root complex (112). In one or more embodiments of the invention, the CPU (110) is a hardware processor component for processing instructions of the host. The CPU (110) may include multiple hardware processors. Alternatively or additionally, each hardware processor may include multiple processing cores in one or more embodiments of the invention. In general, the CPU (110) is any device configured to execute instructions on the host (101).

In one or more embodiments of the invention, the memory (113) is any type of hardware device for storage of data. In one or more embodiments of the invention, the memory (113) may be partitioned on a per-virtual machine basis, such that each virtual machine (e.g., control virtual machine (106), virtual machine 1 (104a), virtual machine Y (104b)) is allocated separate and distinct memory. In one or more embodiments of the invention, the memory (113) includes functionality to store send queues (not shown).

A separate send queue may be stored in memory for each queue pair. In one or more embodiments of the invention, a send queue includes functionality to store an ordered list of command identifiers for commands for processing by the host channel adapter (102). In one or more embodiments of the invention, the command identifiers may be the actual commands and/or references to the commands.

In one or more embodiments of the invention, the root complex (112) includes functionality to connect the CPU and memory subsystem to a peripheral component interconnect Express (PCIe) switch fabric. Specifically, in one or more embodiments of the invention, the root complex (112) connects the host (101) to the host channel adapter (102). Although FIG. 1 shows the root complex (112) as separate from the CPU (110), the root complex (112) may be integrated as part of the CPU.

The root complex (112) includes an input/output memory management unit (IOMMU) (124) in one or more embodiments of the invention. The IOMMU (124) includes functionality to connect a direct memory access (DMA) I/O bus to the memory. In one or more embodiments of the invention, the IOMMU (124) includes functionality to translate addresses from one level of abstraction to another. For example, the IOMMU may translate addresses from GPA to an MPA when the HCA requests access to host memory. In one or more embodiments of the invention, the root complex (112) may support an Address Translation Service (ATS) for alleviating the GPA→MPA translation in the root complex (112) (where "→" is used to mean a translation from GPA to MPA).

Continuing with FIG. 1, the host (101) is connected to the HCA (102). In one or more embodiments of the invention, the connection between the host (101) and the HCA (102) may be a PCI express connection. Specifically, the HCA may connect to a PCI express fabric connector on the host.

In one or more embodiments of the invention, the HCA (102) is a hardware device configured to connect the host (101) to the Infiniband® network (140). Specifically, the HCA (102) includes functionality to receive commands from the host (101) and process the commands. Processing the commands may include performing DMA with host memory to obtain and store packet data and to obtain control information, performing any validation required on the packet data, generating packets from the packet data, and sending and receiving packets on the Infiniband® network (140). FIG. 1 shows a schematic diagram of the HCA (102) from the prospective of the host (101). As shown in FIG. 1, the HCA (102) includes at least one Infiniband® port (e.g., Infiniband® port 1 (126a), Infiniband® port 2 (126b)), a resource pool (128), and an embedded processor subsystem (130). Each of the components of the HCA is discussed below.

In one or more embodiments of the invention, an Infiniband® port (e.g., Infiniband® port 1 (126a), Infiniband® port 2 (126b)) is a physical interface connector between the HCA (102) and the Infiniband® network (140). Although FIG. 1 shows two Infiniband® ports, more or fewer ports may exist without departing from the invention.

The resource pool (128) is a collection of resources that are required to send and receive packets on the Infiniband® network. Specifically, the resource pool (128) corresponds to the collection of hardware and stored data that is shared by the virtual machines (e.g., control virtual machine (106), virtual machine 1 (104a), virtual machine Y (104b)). In general, the resource pool is configured to receive and execute commands from the virtual machines (104a, 104b). A command corresponds to an instruction to the HCA. For example, a command may be an instruction to send a message on the Infiniband® network (not shown). A command includes command data in one or more embodiments of the invention. Specifically, command data is data in the command. When the command is an instruction to send a message on the Infiniband® network, the command may include the message itself or one or more addresses in the host memory having the message. The HCA is configured to obtain the command, obtain the message from the command or from host memory referenced in the command, partition the message into packets if required, and send the packets on the Infiniband® network in accordance with an Infiniband® protocol. In one or more embodiments of the invention, the message is packet data. Specifically, packet data is data sent in the packets on the Infiniband® network. Thus, the packet data may be in the command or in the one or more addresses in host memory.

In one or more embodiments of the invention, the sharing of the resource pool is performed using the concepts of physical function and virtual functions. A physical function (132) exposes the actual hardware of the HCA (102) to an operating system. Specifically, by way of the physical function, the control virtual machine operating system (118) may control the HCA. Thus, the physical function allows the control virtual machine (106) to control the HCA (102), such as to disable the HCA (102).

A virtual function (e.g., virtual function 1 (134a), virtual function Y (134b)) exposes a virtualized HCA to a virtual machine. Specifically, the virtual function (e.g., virtual function 1 (134a), virtual function Y (134b)) exposes to the virtual machine operating system only the partition of the resource pool allocated to the virtual machine. To the guest virtual machine (e.g., virtual machine 1 (104a), virtual machine Y (104b)), the resources exposed by the virtual function (e.g., virtual function 1 (134a), virtual function Y (134b)) appear as if the resource are the only resources on the HCA (102). Thus, the virtual function (e.g., virtual function 1 (134a), virtual function Y (134b)) allows the virtual machine operating system (e.g., OS 1 (114a), OS Y (114b)) to control the portion of resources allocated to the virtual machine. In other words, a virtual function (e.g., virtual function 1 (134a), virtual function Y (134b)) provides the virtual machine operating system (e.g., OS 1 (114a), OS Y (114b)) the appearance that the virtual machine operating system (e.g., OS 1 (114a), OS Y (114b)) is controlling the HCA (102) as a whole even though the actions of the virtual machine operating system (e.g., OS 1 (114a), OS Y (114b)) do not affect any other virtual function (e.g., virtual function 1 (134a), virtual function Y (134b)).

In one or more embodiments of the invention, the term, underlying function (UF), is used to generically refer to either a physical function or a virtual function. Specifically, as used herein, an underlying function may be a physical function or a virtual function.

In one or more embodiments of the invention, the physical function (132) and the virtual function (e.g., virtual function 1 (134a), virtual function Y (134b)) reside in a PCIe core (140). The PCIe Core (140) is hardware configured to receive address translation requests from the embedded processor subsystem (EPS) (130). More specifically, in one or more embodiments of the invention, the PCIe core (140) implements an interface (not shown) for communicating with the address translation interface (ATI) (138) of the EPS (130). The PCIe Core (140) is also configured to respond to the ATI request sent by the EPS (130) with a GPA→MPA address translation. In one or more embodiments of the invention, the PCIe Core (140) acts as (or represents) an UF in order to receive and respond to ATI requests from the EPS. Specifically, in one or more embodiments of the invention, the PCIe Core sends the ATI request to the root complex over the PCIe bus. The root complex then returns a response containing the translated MPA address.

The EPS (130) corresponds to an embedded processor and logic for managing the HCA (102). The logic may be firmware or hardware logic. The EPS (130) includes a service processor resource manager (136). The service processor resource manager (136) includes functionality to receive and process the management commands on the HCA (102). For example, the management commands may be to change the allocation of HCA resources, change the configuration of the HCA, and perform other management of the HCA. With regards to resource allocation, the service processor resource manager includes functionality to change the allocation of the HCA resources to underlying functions and change the allocation of the HCA resources to quality of service (QoS) levels within the underlying functions.

As described briefly above, the EPS (130) includes an ATI (138), which may be set of wires and/or buses that communication directly with the PCIe Core (140) in the HCA to request and obtain responds to ATI requests. In one or more embodiments of the invention, the ATI requests correspond to address translations for static memory structures in the HCA (102) (i.e., structures which have the same GPA and MPA for as long as the vHCA device driver (122) is executing. Such structures may include, but are not limited to, a table stored in the HCA for tracking queue pair state (QPS), a table storing DMA validations for validating memory access requests from the HCA to host memory, various descriptor tables/arrays, and any other suitable data structure that remains static in the GPA→MPA address translation layer. Further, in one or more embodiments of the invention, the EPS (130) includes functionality to store the received ATI translations directly into control and status registers (CSRs) located in the HCA (102). The CSRs are discussed further in FIG. 2 below.

In one or more embodiments, the EPS (130) also includes a translation record (136) which maintains a record all translations requested and obtained by the EPS for static memory structures in the HCA (102), and currently in use by the HCA. The translation record (136) may be a table, array, or any other suitable data structure which tracks which static memory structures have been pre-translated by the root complex and provided to the EPS via the PCIe Core for loading into corresponding address CSRs. Pre-translated addresses are defined as GPAs which are translated to MPAs before, for example, an entity in the UF requests such a translation. More specifically, pre-translated addresses are MPAs of HCA static memory structures obtained by the EPS and stored in CSRs in the HCA. In one or more embodiments of the invention, the translation record (136) is used to respond to the root complex (122) in the host (101) with information about the pre-translated addresses when the pre-translated addresses are invalidated by a component, such as software, in the host (101).

Figure 2:
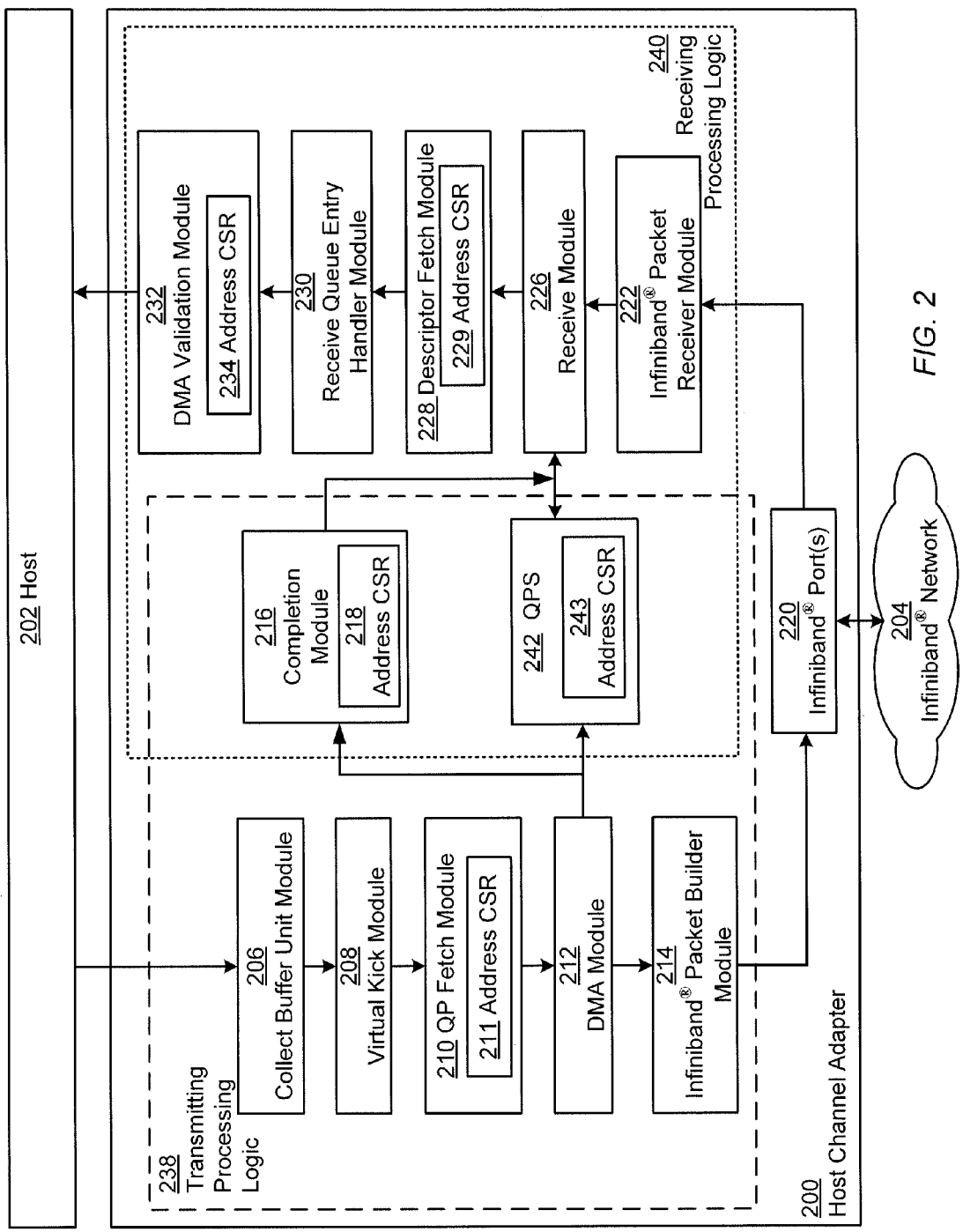

As discussed above, FIG. 1 provides a general diagram of the HCA (102) in one or more embodiments of the invention. FIG. 2 shows a schematic diagram of the receiving pipeline within the HCA (200). Specifically, FIG. 2 shows components of the resource pool for transmission and receipt of messages on the Infiniband® network as shared between virtual machines and components to allocate resources of the resource pool in one or more embodiments of the invention. More specifically, resource pool includes a transmit pipeline for transmitting packets through the Infiniband® network (204) with transmitting processing logic (238), and a receive packet processing pipeline (also referred to as a receive pipeline of the HCA) for receiving packets from the Infiniband® network (204). The receive pipeline includes with responder processing logic (240) for processing each received packet.

As shown in FIG. 2, in one or more embodiments of the invention, the transmit and receive pipelines are partitioned into modules (222-232). Each module corresponds to hardware and/or firmware that includes functionality to perform a portion of the receive pipeline. Each module is configured to process data units. Each data unit corresponds to a command or a received message or packet. For example, a data unit may be the command, an address of a location on the communication adapter storing the command, a portion of a message corresponding to the command, a packet, an identifier of a packet, or any other identifier corresponding to a command, a portion of a command, a message, or a portion of a message.

Referring to FIG. 2, the dark arrows between modules show the transmission path of data units between modules as part of processing commands and received messages in one or more embodiments of the invention. Data units may have other transmission paths (not shown) without departing from the invention. Further, other communication channels and/or additional components of the HCA (200) may exist without departing from the invention. Each of the modules for the responder processing logic (240) is described in detail below.

As shown in FIG. 2, the HCA (200) may include, in the transmitting processing logic (238), a collect buffer unit module (206), a virtual kick module (208), a queue pair fetch module (210), a direct memory access (DMA) module (212), an Infiniband® packet builder module (214), and one or more Infiniband® ports (220). A completion module (216), and a queue pair state module (240) are located as part of both the transmitting and receive pipeline. The receiving processing logic (240) may include the Infiniband® packet receiver module (IPRM) (222), receive module (226), descriptor fetch module (228), receive queue entry handler module (230), and DMA validation module (232).

The collect buffer controller module (206) includes functionality to receive command data from the host and store the command data on the HCA. Specifically, the collect buffer controller module (206) is connected to the host and configured to receive the command from the host and store the command in a buffer. When the command is received, the collect buffer controller module is configured to issue a kick that indicates that the command is received.

In one or more embodiments of the invention, the virtual kick module (208) includes functionality to load balance commands received from applications. Specifically, the virtual kick module is configured to initiate execution of commands through the remainder of the transmitting processing logic (238) in accordance with a load balancing protocol.

In one or more embodiments of the invention, the queue pair fetch module (210) includes functionality to obtain queue pair state information for the QP corresponding to the data unit associated with an original work request. Specifically, per the Infiniband® protocol, the original work request has a corresponding send queue and a receive queue in main memory in the host (202). The send queue and receive queue form a QP. Accordingly, the QP corresponding to the original work request is the QP corresponding to the data unit in one or more embodiments of the invention. More specifically, a work request is a request from the host to the HCA for the HCA to perform one or more operations. As such, a work request may include one or more commands for performing an action. In one or more embodiments of the invention, a work request is processed via the transmitting processing logic and the receiving processing logic of one or more HCAs, and is committed to a send queue in host memory before being transmitted to the HCA (200).

When a new work request enters the transmit or receive pipelines of the HCA, the QP fetch module (210) is responsible for associating the new work request with a QP index. The QP index may be stored in a QP state cache (QPSC) (not shown) located in the HCA. The QP index is the index into the QPSC corresponding to the QP associated with the work request. Specifically, the QPSC is a cache residing in the HCA, caching QP entries read and written from a QP state array in host memory. The QP index is obtained and associated with the original work request by performing a search across active QPs. The search is performed with a {UF, QP Number} pair. On a QPSC miss, a new index is assigned that QP. On a QPSC hit, the hit index is returned. The QP fetch module (210) also loads the obtained QP index with the correct QP state. On a QPSC hit, the correct QP state may already be present (or may be in the process of being fetched). Otherwise, the QP state is read from the QP state array in host memory. The QP fetch module (210) stores the QP index and associated state information for each new work request in a static data structure, such as, for example, a QP fetch linked list queue, array, table, or any other suitable data structure (not shown). The data structure used by the QP fetch module (210) to store and manage the above-mentioned information is static because the data structure occupies the same GPAs and MPAs for as long as the vHCA device driver for the HCA (200) is executing. That is, the data structure in the QP fetch module (210) is pinned (does not move its virtual or physical machine addresses) in memory. In this manner, the address translations for the data structure may be pre-fetched before the addresses may be required by the HCA.

The static memory structure described in associated with the QP fetch module (210) above is associated with an address CSR (211). An address CSR is a hardware register that stores an address associated with the data structure with which the address CSR is linked. The address CSR (211) of the QP fetch module (210) is a register associated with such static memory structures, which typically includes the virtual page address of the static memory structure. However, in one or more embodiments of the invention, the address CSR (211) of each such static memory structure is configured to store the pre-translated MPA address of the static data structure linked to the QP fetch module (210). Specifically, because the location of the static data structure linked to the QP fetch module (210) is known to be at a single place in virtualized and physical machine memory, the address CSR (211) is used to store a pre-translated MPA of the data structure for later use.

In one or more embodiments of the invention, the DMA module (212) includes functionality to perform DMA with host memory. The DMA module may include functionality to determine whether a command in a data unit or referenced by a data unit identifies a location in host memory that includes payload. The DMA module may further include functionality to validate that the process sending the command has necessary permissions to access the location, and to obtain the payload from the host memory, and store the payload in the DMA memory. Specifically, the DMA memory corresponds to a storage unit for storing a payload obtained using DMA.

Continuing with FIG. 2, in one or more embodiments of the invention, the DMA module (212) is connected to an Infiniband® packet builder module (214). In one or more embodiments of the invention, the Infiniband® packet builder module includes functionality to generate one or more packets for each data unit and to initiate transmission of the one or more packets on the Infiniband® network (204) via the Infiniband® port(s) (220). In one or more embodiments of the invention, the Infiniband® packet builder module may include functionality to obtain the payload from a buffer corresponding to the data unit, from the host memory, and/or from an embedded processor subsystem memory.

The completion module (216) includes functionality to manage packets for QPs set in reliable transmission mode. Specifically, in one or more embodiments of the invention, when a QP is in a reliable transmission mode, then the responder HCA of a new packet responds to the new packet with an acknowledgement message for certain types of operations indicating that transmission was successful, or an error message indicating that transmission failed. In one or more embodiments of the invention, the completion module (216) includes functionality to receive this acknowledgement message from a responder channel adapter and to manage data units corresponding to packets until an acknowledgement is received or transmission is deemed to have failed (e.g., by a timeout).

Further, the completion module (216) may include a CSR (218). In one or more embodiments of the invention, the CSR (218) is used to store the pre-translated MPA address of the completion queue (not shown) which resides in host memory. Alternatively, the CSR (218) may store the pre-translated MPA address of the completion descriptor for the completion queue. The completion queue descriptor may be obtained by the descriptor fetch module (228). A descriptor includes metadata associated with the data structure with which the descriptor is associated. In one or more embodiments of the invention, the Completion Queue Descriptor (CQD) is a static memory structure in HCA (200). That is, the CQD has the same abstracted virtual address (GPA) and physical address (MPA) associated with its location as long as the vHCA device driver is running.

In one or more embodiments of the invention, the queue pair state (QPS) (242) data structure stores the queue pair state of each queue pair associated with the HCA (200). The QPS is responsible for fetching, caching, and tracking the QPs for all incoming and outgoing requests which are currently present in the TSU. The queue pair state information may include, for example, a sequence number, an address of remote receive queue/send queue, whether the queue pair is allowed to send or allowed to receive, and other state information. The QPS (242) may be a table, an array, or any other suitable data structure. In one or more embodiments of the invention, the QPS (242) is a static memory structure in HCA (200). That is, the QPS (242) has the same GPA and MPA associated with its location in virtualized and physical memory as long as the vHCA device driver is running.

In one or more embodiments of the invention, the Infiniband® packet receiver module (222) includes functionality to obtain the QPs for each packet from the QPS (242). In one or more embodiments of the invention, the receive module (226) includes functionality to validate the QP state information obtained for the packet.

Additionally or alternatively, the receive module (226) includes a queue that includes functionality to store data units waiting for one or more reference to buffer location(s) or waiting for transmission to a next module. Specifically, when a process in a virtual machine is waiting for data associated with a queue pair, the process may create receive queue entries that reference one or more buffer locations in host memory in one or more embodiments of the invention. For each data unit in the receive module hardware linked list queue, the receive module includes functionality to identify the receive queue entries from a HCA cache or from host memory, and associate the identifiers of the receive queue entries with the data unit.

In one or more embodiments of the invention, the descriptor fetch module (228) includes functionality to obtain descriptors for processing a data unit. For example, the descriptor fetch module may include functionality to obtain descriptors for a receive queue, a shared receive queue, a ring buffer, and the aforementioned completion queue. In one or more embodiments of the invention, the descriptor fetch module (228) also includes a CSR (229) for storing the pre-translated address of one or more of the aforementioned descriptors. Descriptors are static memory structures as defined above. The CSR (229) of the descriptor fetch module (228) may also store the descriptor of the QPS static memory structure.

In one or more embodiments of the invention, the receive queue entry handler module (230) includes functionality to obtain the contents of the receive queue entries. In one or more embodiments of the invention, the receive queue entry handler module (230) includes functionality to identify the location of the receive queue entry corresponding to the data unit and obtain the buffer references in the receive queue entry. In one or more embodiments of the invention, the receive queue entry may be located on a cache of the HCA (200) or in host memory.

In one or more embodiments of the invention, the DMA validation module (232) includes functionality to perform DMA validation and initiate DMA between the HCA and the host memory. Further, in one or more embodiments of the invention, the DMA validation module (232) includes functionality to read data from the payload RAM (242) and write the data to host memory. In one or more embodiments of the invention, the DMA validation module (232) is also configured to validate one or more keys before corresponding memory accesses are authenticated. Specifically, each memory access key must be validated using the information stored in a DMA validation table (not shown) before memory access using the key is permitted. The DMA validation table stores DMA validation entries against which memory access keys (234) are validated. The DMA validation table is another static memory structure as defined above. Accordingly, DMA validation module (232) includes an Address CSR (234). The address CSR (234) is configured to store the pre-translated address of the DMA validation table.

In one or more embodiments of the invention, each address CSR shown in FIG. 2 is register for storing pre-translated MPA addresses for static memory structures. There may be more address CSRs than shown in FIG. 2, which may be associated with other static memory structures not described herein. For example, address CSRs in the HCA may exist for ring buffer descriptor arrays, receive queue descriptor arrays, etc. Other transport modes (e.g., in addition to reliable transport mode) may exist for which further static memory structures may be required. Accordingly, address CSRs associated with such additional static memory structures may exist for different transport modes. Furthermore, the address CSRs are not limited to the locations in modules shown in FIG. 2. The address CSRs may be located elsewhere in the HCA, depending on which static memory structure the CSR represents.

Although FIGS. 1-2 show a certain configuration of components, other configurations may be used without departing from the invention. For example, in one or more embodiments of the invention, each of the address CSRs are configured to be loaded directly by the EPS (shown in FIG. 1), after the EPS requests and obtains a pre-translation for one or more static memory structures. The EPS may load the pre-translated MPA address in an MMU context that is an extension or a part of the address CSR. The MMU context may be additional dedicated hardware bits of the address CSR provided for storing the pre-translated address of one or more static data structures of the HCA. In one or more embodiments of the invention, the pre-translated address stored in each address CSR may be a base address of the static memory structure plus an offset indicating the size of the static memory structure. Other variations of the system may be used without departing from the invention.

Figure 3:
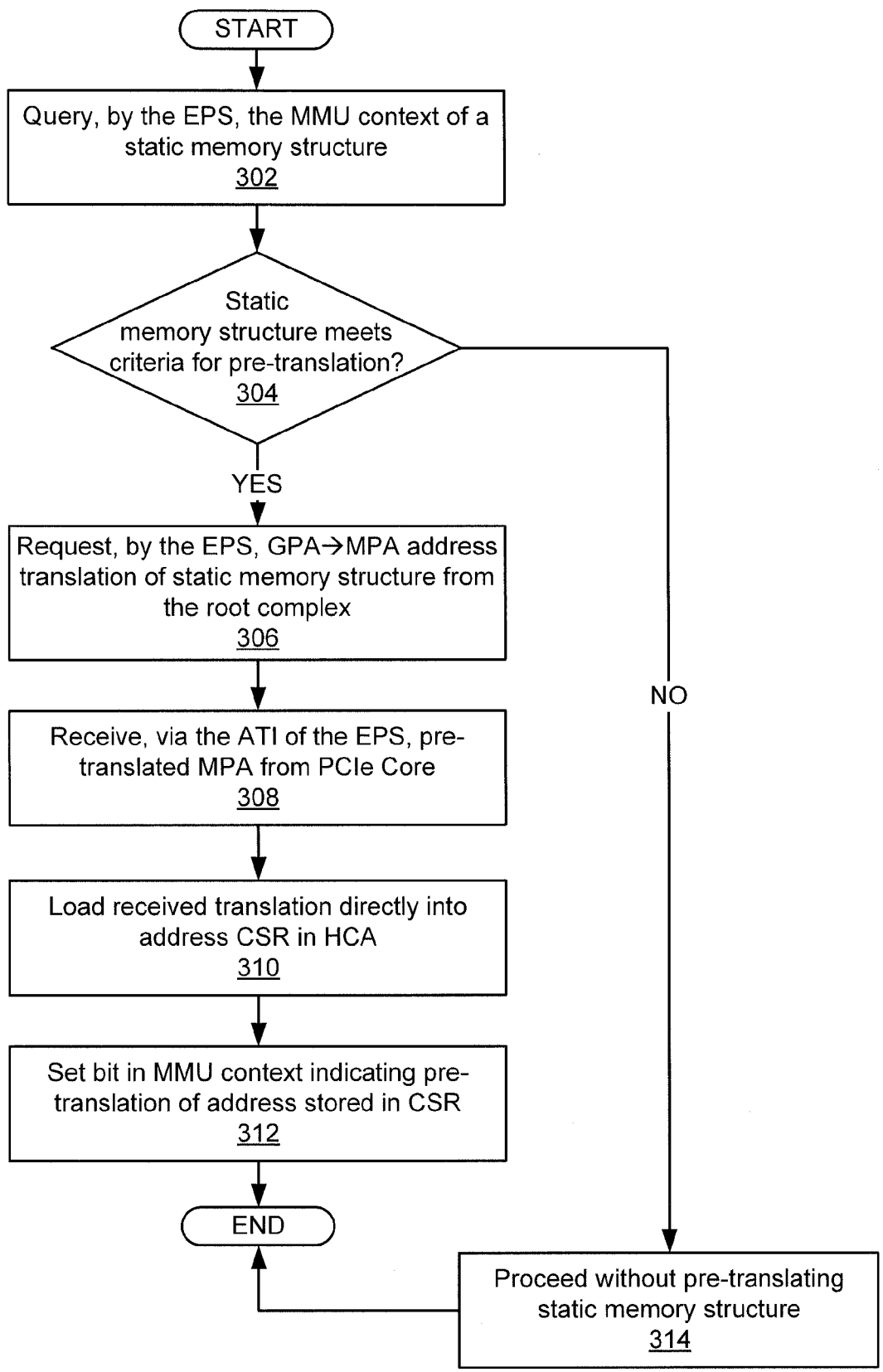
FIGS. 3-4 show flowcharts for a providing address translation for static HCA structures in accordance with one or more embodiments of the invention.

FIG. 3 shows a flowchart in one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

More specifically, FIG. 3 shows a method for determining, by the EPS, whether pre-translations for particular static memory structures in the HCA may be requested. Initially, the EPS queries the MMU context of a static memory structure (ST 302). The EPS may perform the MMU context query as a background process to optimize particular address translations. Alternatively, the EPS may be triggered to query the MMU context of static memory structures when the vHCA is booted up. As described above, the MMU context may be an extension of an address CSR located in the HCA. Thus, the EPS may query the address CSR to determine whether the additional bits for the static memory structure stored as an MMU context allows for pre-translation of the static memory structure. Specifically, a determination is made by the EPS as to whether the size and alignment of the static memory structure is suitable for pre-translation (ST 304). In one or more embodiments of the invention, a good candidate for pre-translation is defined by the static memory structure spanning a contiguous block of space in machine physical address (MPA) space. For example, if a static memory structure spans a single memory page of MPA space (or less than a single page of memory), then the static memory structure is a suitable candidate for pre-translation, in one or more embodiments of the invention. By obtaining the base address and the offset stored in the MMU context of each address CSR of the static memory structure, the EPS is configured to ascertain whether the address CSR associated with the static memory structure should be optimized to store a pre-translated MPA of the static memory structure.

If the size of the static memory structure does not match the contiguous space criteria (i.e., spans more than one memory page), then the process proceed without pre-translation of the static memory structure base address (ST 314). More specifically, the I/O device (e.g., the HCA) may obtain the translation at the time of requesting an operation to be performed, via the root complex and IOMMU of the host. When the size of the static memory structure matches the contiguous space criteria, the EPS requests the PCIe Core to send a PCIe request to the root complex and ask for an GPA→MPA address translation of the static memory structure (ST 306). Specifically, the EPS uses the ATI to directly communication with the PCIe Core in the HCA to request the PCIe core to send a PCIe request to the root complex. The root complex then returns a response containing the translation for the base address of the static memory structure to the PCIe core which forwards the response to the EPS. Accordingly, the EPS receives the pre-translated MPA, via the ATI, from the PCIe Core (ST 308).

Next, the EPS loads the received translation directly into the corresponding address CSR in the HCA for that static memory structure (ST 310). Specifically, the original contents of the address CSR (which may be the GPA of the static memory structure) are replaced with the pre-translated MPA of the static memory structure. In one or more embodiments of the invention, the EPS has direct access to each of the address CSRs located in the HCA. Upon loading the pre-translated MPA address, the EPS sets a bit in the MMU context of the address CSR containing the pre-translated address (ST 312). The set bit indicates, in one or more embodiments of the invention, that the address stored in the address CSR is pre-translated (i.e., does not require the IOMMU in the root complex to translate the address, but asks the IOMMU in the root complex to carry out the request using the pre-translated address).

Those skilled in the art will appreciate that the method described in FIG. 3 may be repeated for each static memory structure in the HCA. That is, the EPS may evaluate each static memory structure separately using the method of FIG. 3, in order to optimize the address translation for those static memory structures that meet the size criteria as described above. Further, the method of FIG. 3 may be performed at any time before a request to perform an operation on the static memory structure is received. For example, the method of FIG. 3 may be performed as a background process when the vHCA device driver is booted up, or when the EPS is free enough to optimize address translations.

Figure 4:
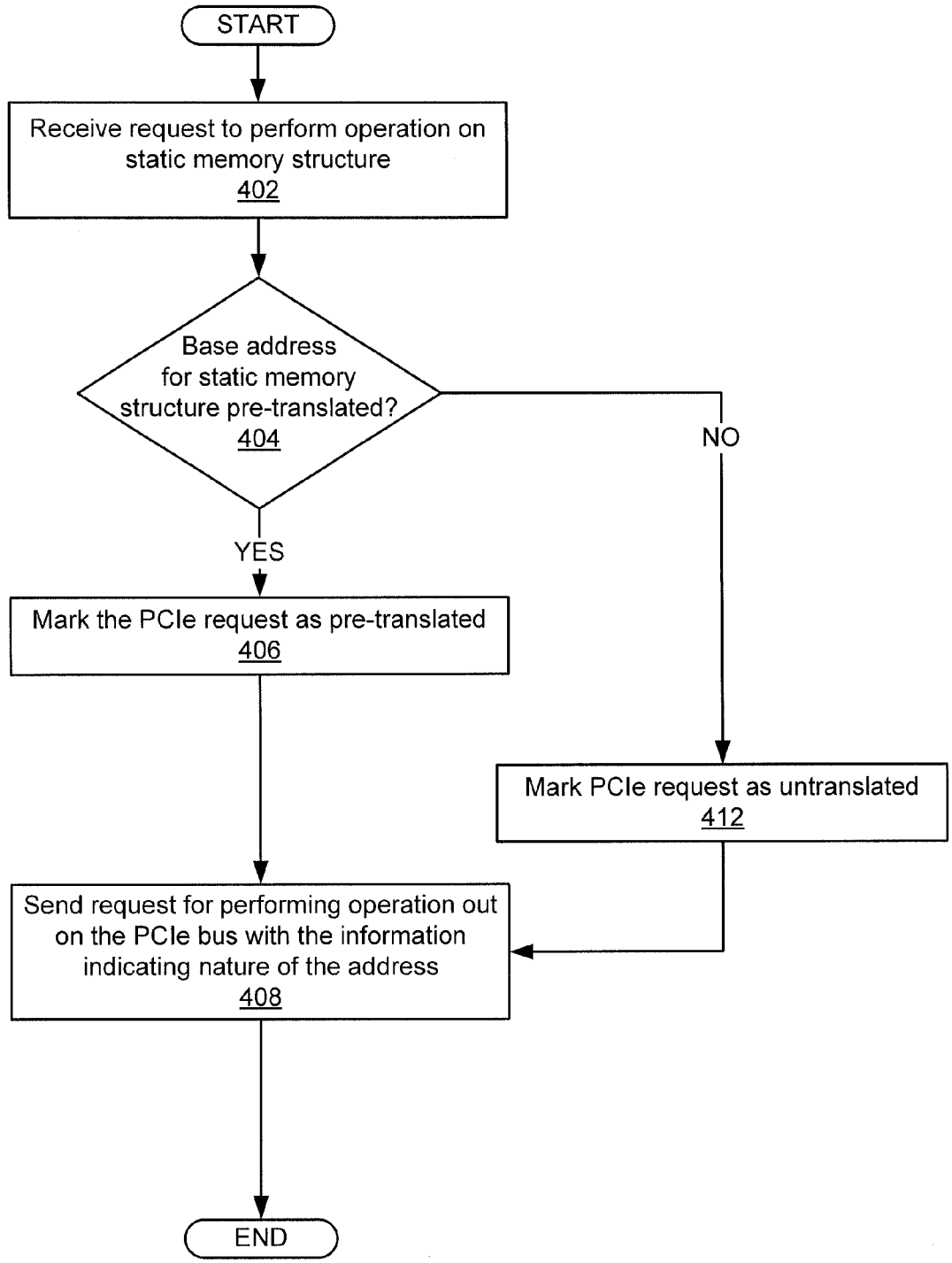

FIG. 4 shows flowchart for a method of using the pre-translated address stored in one or more address CSRs, in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Initially, a request to perform an operation on a static memory structure is received (ST 402). The operation requested may be a request to read from or write to the static memory structure by the HCA. In one or more embodiments of the invention, the request is sent from an I/O device, such as the HCA, to the root complex. On the request sent on the PCIe bus to the root complex, there exists information to inform the root complex whether the request is untranslated or pre-translated. Specifically, in one or more embodiments of the invention, the bit from the MMU context is used to set the bits in the PCIe request to indicate the nature of the address (i.e., untranslated or pre-translated). If a translation of the address is requested by the HCA (i.e., when the address is not pre-translated), the bits in the PCIe request are used to indicate that the request is an address translation request.

Next, a determination is made as to whether the base address for the static memory structure has been pre-translated (ST 404). Specifically, the HCA checks the MMU context in the address CSR associated with the static memory structure to read the bit that is set by the EPS when the EPS has pre-translated the address for the static memory structure. Accordingly, when the MMU context bit is set, indicating pre-translation of the address stored in the CSR, the PCIe request is marked as pre-translated (ST 406). If the address has not been pre-translated by the root complex (e.g., because the static memory structure was not a suitable candidate for pre-translation), then the PCIe request is marked as untranslated, and the bits of the PCIe request are used to indicate that the PCIe request is or includes an address translation request (ST 412). The request is then sent out on the PCIe bus with the information indicating the nature of the address (i.e., pre-translated or untranslated) (ST 410).

Returning to ST 404, when the address has been pre-translated by the root complex and stored in the corresponding address CSR by the EPS, the request to perform the operation is sent out on the PCIe bus, along with an indication that the address accompanying the request is pre-translated (ST 408). In one or more embodiments of the invention, this indication of pre-translation may be a bit set in the PCIe request. The operation may then be performed on the static memory structure without obtaining a translation of the address of the static memory structure.

Software executing in the host may invalidate one or more GPA→MPA address translations of static memory structures currently being used on the HCA. When this occurs, the EPS is responsible for invalidating the pre-translated address stored in the address CSR. To facilitate this, the EPS includes a translation record of all the translation currently in use on the HCA chip, such that the EPS may respond to address translation invalidations from the host. Accordingly, although not shown in FIGS. 3-4, there may be additional steps performed by the EPS when address translations are invalidated. In particular, the EPS may use the translation record to look up the address CSR affected by the invalidation, and either replace the pre-translated address with the corresponding GPA, or remove any address in the address CSR altogether.

Those skilled in the art will appreciate that while the aforementioned discussion focuses on the HCA device as an I/O device requesting to perform an operation in host memory via a PCIe bus, embodiments of the invention may apply to any I/O bus which supports pre-translated addresses and is not limited to a PCIe bus.

Figure 5:
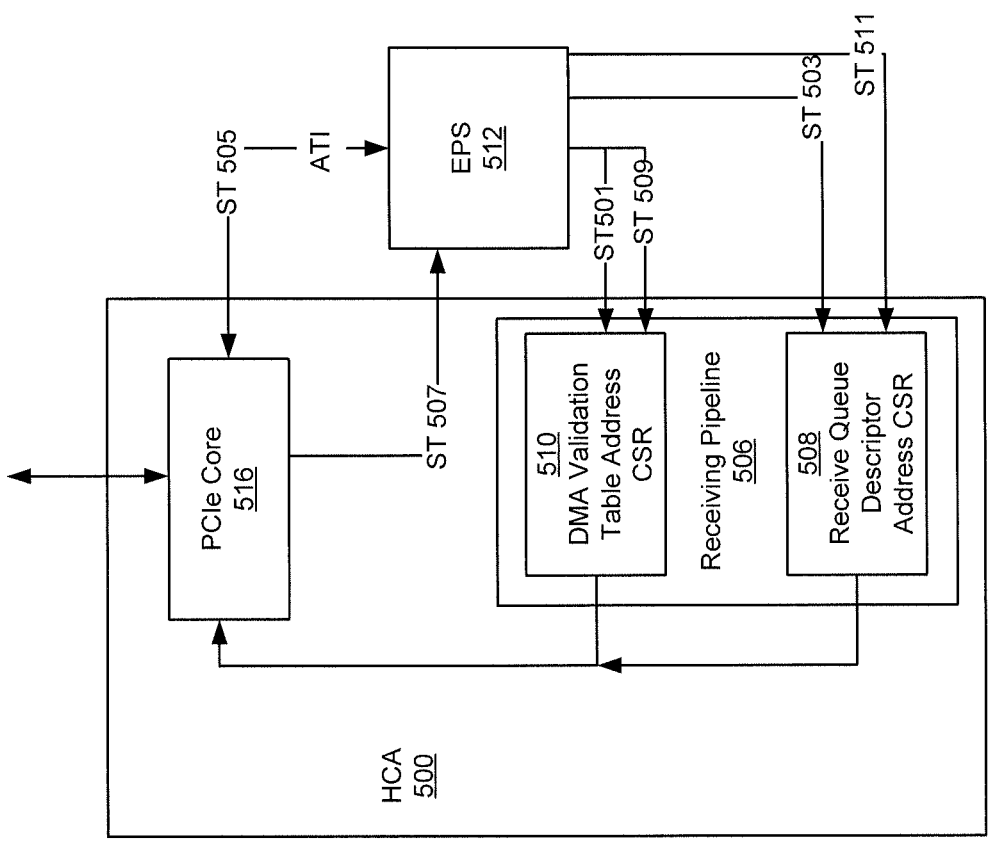
FIG. 5 shows an example of address translation for static HCA structures in accordance with one or more embodiments of the invention.

FIG. 5 shows a flow diagram for flow control for the address translation of static memory structures described by embodiments of the present invention. Specifically, FIG. 5 is an example of how multicast packet replication is implemented in the Infiniband® HCA, and is not meant to limit embodiments of the invention.

Specifically, FIG. 5 shows an example of obtaining pre-translations of the base addresses for two static memory structures that are part of the receive pipeline (506) in the HCA (500): 1) the DMA validation table, and 2) the receive queue descriptor. The receive queue descriptor may be in the form of a data structure such as an array or a linked list. Both the DMA validation table and the receive queue descriptor data structure are located at the same GPA and MPA from the time that the vHCA starts up, and for as long as the vHCA is running.

Initially, in ST 501, the EPS (512) accesses the DMA validation table address CSR (510) to determine whether the size of the DMA validation table spans a contiguous block of memory space. In ST 503, the same determination is performed for the receive queue descriptor data structure by accessing the receive queue descriptor address CSR (508). In this example, both the DMA validation table and the receive queue descriptor data structure span one memory page (or less). Therefore, the sizes of both static memory structures match the criteria for address translation optimization.

Accordingly, in ST 505, the EPS (512), via the ATI provided therein, requests the address translation for both static memory structures from the PCIe Core (516). In ST 507, the PCIe Core (516) subsequently obtains and responds to the EPS (512) request with the appropriate MPA base address translations for both the DMA validation table and the receive queue descriptor data structure. The EPS (512) then loads the received translations into the corresponding address CSRs associated with both the DMA validation table and the receive queue descriptor data structure (ST 509 and ST 511). The EPS also sets a bit in the MMU context of both address CSRs indicating that the addresses stored in the CSRs are pre-translated. Those skilled in the art having benefit of this disclosure will appreciate that the address translations for each of the DMA validation table and the receive queue descriptor data structure may be requested separately, in two individual requests on the ATI, or as a single request. Similarly, the response from the PCIe Core may be a single response including both address translations, or two individual separate responses for each static memory structure.

At a later point in time, the HCA may request to read from or write to the DMA validation table. When the request is received, the address for the DMA validation table is obtained from the corresponding CSR. As the EPS has marked this address as pre-translated in the MMU context of the address CSR, the bits from the MMU context are used to indicate in the PCIe request that the address included in the request is the pre-translated MPA. Accordingly, the request for access to the DMA validation table proceeds to be processed by the root complex without obtaining a translation of the address included in the PCIe request.

As shown by way of the flow diagram of FIG. 5, embodiments of the invention provide a mechanism for firmware/hardware in a HCA associated with the Infiniband® network to directly obtain address translations for static memory structures. This allows for CSRs which already exist in the HCA to be candidates for ATI pre-translations. CSRs are easier to query and traverse than implementing a hardware cache which stores address translations for requests sent from an I/O device to the root complex in the host, thereby reducing latency times in obtaining translations, and resulting in less throttling of performance.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for address pre-translation for a host channel adapter (HCA) static memory structure, comprising:
   determining that the HCA static memory structure spans a contiguous block of physical address space;
   requesting, based on the HCA static memory structure spans the contiguous block of physical address space, a translation from a guest physical address (GPA) to a machine physical address (MPA) of the HCA static memory structure;
   storing a received MPA corresponding to the HCA static memory structure in an address control and status register (CSR) associated with the HCA static memory structure;
   marking the received MPA stored in the address CSR as a pre-translated address; and
   using the pre-translated address stored in the address CSR when a request to access the static memory structure is received.

2. The method of claim 1, wherein determining that the HCA static memory structure spans the contiguous block of physical address space comprises:
   querying the address CSR associated with the HCA static memory structure to obtain a base address and a size of the HCA static memory structure.

3. The method of claim 1, wherein the translation is requested by an embedded processor subsystem (EPS) of the HCA using an address translation interface (ATI).

4. The method of claim 3, wherein the ATI permits the EPS to directly request the translation and receive the received MPA from a PCIe core component of the HCA.

5. The method of claim 4, wherein the PCIe core component forwards the request from the EPS to a root complex in a host operatively connected to the HCA, and wherein the root complex translates the GPA to the received MPA and provides the received MPA to the PCIe core component to forward to the EPS via the ATI.

6. The method of claim 1, wherein the HCA static memory structure is a control data structure residing at a same virtual address and a same physical address for as long as a virtualized HCA device driver corresponding to the HCA is operating.

7. The method of claim 1, wherein marking the received MPA stored in the address CSR comprises setting a bit in the address CSR associated with the HCA static memory structure.

8. The method of claim 7, wherein using the pre-translated address comprises:
   marking a PCIe request for accessing the static memory structure as pre-translated based on the bit set in the address CSR.

9. A host channel adapter (HCA) comprising:
   an embedded processor subsystem (EPS) comprising an address translation interface (ATI), wherein the EPS is configured to issue a guest physical address (GPA) to machine physical address (MPA) request via the ATI;

a PCIe core component configured to receive and respond to the GPA to MPA address translation request from the EPS; and an address control and status register (CSR) corresponding to an HCA static memory structure, wherein the EPS is further configured to:
- determine whether the HCA static memory structure spans a contiguous block of physical address space;
- issue the GPA to MPA request, when the HCA static memory structure spans the contiguous block of physical address space to obtain a pre-translated address for the HCA static memory structure;
- store the pre-translated address corresponding to the HCA static memory structure in the address CSR corresponding to the HCA static memory structure; and
- mark the pre-translated address in the address CSR as pre-translated.

10. The HCA of claim 9, wherein determining whether the HCA static memory structure spans the contiguous block of physical address space comprises:
- querying the address CSR associated with the HCA static memory structure to obtain a base address and a size of the HCA static memory structure.

11. The HCA of claim 9, wherein the HCA static memory structure is a control data structure residing at a same virtual address and a same physical address for as long as a virtualized HCA device driver corresponding to the HCA is operating.

12. The HCA of claim 11, wherein the HCA static memory structure is one selected from a group consisting of a DMA validation table, a receive queue descriptor data structure, a queue pair state table, and a completion queue descriptor array.

13. The HCA of claim 9, wherein the PCIe core component is further configured to:
- forward the GPA to MPA address translation request from the EPS to a root complex in a host operatively connected to the HCA; and
- receive and forward the pre-translated address from the root complex to the EPS via the ATI.

14. A system comprising:
- a host comprising a root complex configured to translate guest physical addresses (GPAs) to machine physical addresses (MPAs); and
- an HCA operatively connected to the host and comprising:
  - a plurality of address CSRs, each of which correspond to one of a plurality of HCA static memory structures;
  - an EPS comprising an address translation interface (ATI), wherein the EPS is configured to issue a guest physical address (GPA) to machine physical address (MPA) request via the ATI; and
  - a PCIe core configured to receive and respond to the GPA to MPA address translation request from the EPS;
- wherein the EPS is further configured to:
  - determine whether the HCA static memory structure spans a contiguous block of physical address space;
  - issue the GPA to MPA address translation request, when the HCA static memory structure spans the contiguous block of physical address space to obtain a pre-translated address for the HCA static memory structure;
  - store the pre-translated address corresponding to the HCA static memory structure in the address CSR corresponding to the HCA static memory structure; and
  - mark the pre-translated address stored in the address CSR as pre-translated.

15. The system of claim 14, wherein determining whether the HCA static memory structure spans the contiguous block of physical address space comprises:
- querying the address CSR associated with the HCA static memory structure to obtain a base address and a size of the HCA static memory structure.

16. The system of claim 14, wherein the HCA static memory structure is a control data structure residing at a same virtual address and a same physical address for as long as a virtualized HCA device driver corresponding to the HCA is operating.

17. The system of claim 16, wherein the HCA static memory structure is one selected from a group consisting of a DMA validation table, a receive queue descriptor data structure, a queue pair state table, and a completion queue descriptor array.

18. The system of claim 14, wherein the PCIe core component is further configured to:
- forward the GPA to MPA address translation request from the EPS to a root complex in a host operatively connected to the HCA; and
- receive and forward the pre-translated address from the root complex to the EPS via the ATI.

* * * * *